April 6, 1965   J. F. HUFF   3,176,801
PRECISION MOTION CONTROL DEVICE
Filed Oct. 12, 1962
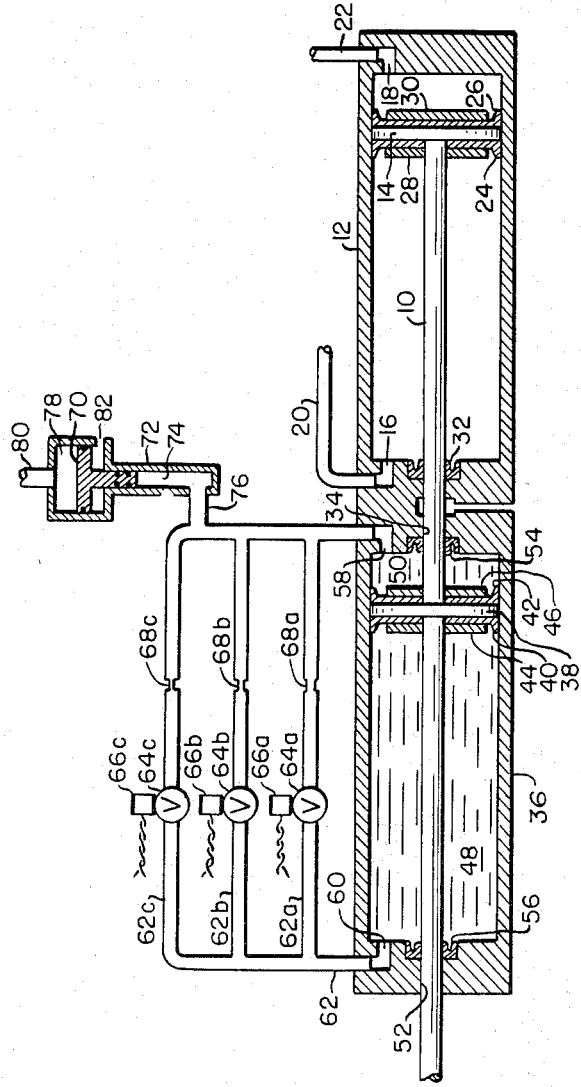
INVENTOR.
JOSEPH F. HUFF
BY *Kenway Jenney & Hildreth*
ATTORNEYS

United States Patent Office 3,176,801
Patented Apr. 6, 1965

3,176,801
PRECISION MOTION CONTROL DEVICE
Joseph F. Huff, Hyde Park, Mass., assignor to Northrop Corporation, Beverly Hills, Calif., a corporation of California
Filed Oct. 12, 1962, Ser. No. 230,179
5 Claims. (Cl. 188—97)

This invention relates to an improved precision motion control device, and generally pertains to a type of motion control device in which a liquid is utilized as a damping or motion-controling medium.

It is the primary object of my invention to provide a positive and precise motion control device for regulating and limiting the movement of a load by motive means. It is a further object of the invention to provide an improved motion control device in which slippage due to compressibility and inclusion of gases in an hydraulic fluid, and to recompression of seals, is minimized so that a more precise positioning is effected. It is still another object of my invention to provide an improved motion control device with means for selectively regulating a rate of motion in a series of precise increments. Additional objects and advantages of the invention will become apparent as the following description proceeds.

Briefly stated, according to a preferred embodiment thereof, I may carry out my invention in a device for controlling linear motion, by first drivingly connecting a piston operable in an hydraulic control cylinder, with an output shaft of the piston of a pneumatic motor. The piston of the hydraulic control device may, for example, be directly secured to the output shaft, which extends through the cylinder to drive any desired load, such as a machine tool carriage, a door, or any other apparatus which is required to be precisely positioned and/or driven at a precisely controlled rate. The opposite ends of the hydraulic control cylinder, i.e. the two expansible chambers divided by the piston within the control cylinder, are connected by conduit means in which valve means are interposed. The output shaft may be stopped in any desired position by closing the valve means, and the rate of motion may be controlled by regulating the orifice area of the conduit means.

According to a feature of the invention, the conduit means may comprise a series of parallel-flow branches, each having independently actuable valve means and each including a fixed-area orifice of a different value. The various valves may be actuated individually, or in any combination, to make available a series of rates of motion in precisely regulated increments. This arrangement is particularly useful in conjunction with digital control systems, such as may be applied to tape-controlled machine tool operation. In this embodiment, the valves are not necessarily regulable, but may have fixed orifice areas, and in many applications are preferably operated by electrical solenoids; the controlling area being that of the fixed-area orifice formed in each branch of the conduit means.

According to a further feature of the invention, means for establishing a predetermined pressure in the hydraulic fluid contained by the closed system formed within the control device are placed in communication with the conduit means. These pressurizing means may, for example, comprise a differential piston which is actuated by the same compressed air supply which operates an associated pneumatic motor, and which applies a pressure greater than that of the air supply by a ratio inversely proportional to the operative areas of the differential piston. By these means, slippage of the control device which might otherwise arise from the compressibility of the hydraulic fluid, from the inclusion of gas bubbles in the fluid, or from recompression of seals required for sealing the cylinder against leakage through the output shaft openings, is minimized to the point of negligibility. While these factors can produce only a relatively small slippage, the improvement in the precision of position control afforded by this arrangement is of very substantial importance where a high degree of accuracy is required.

While the specification concludes with claims particularly pointing out the subject matter which I regard as my invention, it is believed that the invention will be more clearly understood from the following detailed description of a preferred embodiment thereof, referring to the accompanying drawing, in which FIG. 1 is a partially schematic elevation in section of a precision motion control device according to the invention.

The invention is embodied in a linear motion control device for regulating the rate of movement, as well as for halting the movement in any desired position, of the output shaft 10 of motive means, which is illustrated as a pneumatic motor comprising a cylinder 21 having a piston 14 slidably received therein. Ports 16 and 18 are formed in the opposite ends of the cylinder for selective admission and exhaust of compressed air through conduits 20 and 22 connected therein, by means of suitable control and air supply means (not shown). The piston is provided with flexible sealing discs 24 and 26 supported by metal discs 28 and 30, for preventing leakage between the opopsite ends of the cylinder around the piston. A flexible sealing ring 32 of rubber or other material is positioned about the output shaft 10 for sealing the cylinder 12 about a bore 34 formed in an end thereof for protrusion of the shaft 10 to engage an external device to be driven (not shown). The double-acting pneumatic motor which has been described is illustrative of motive means with which the motion control device of the invention may be utilized.

The control device includes a control cylinder 36, which in the preferred embodiment shown is formed with the motor cylinder 12 in a unitary block. A piston 38 is slidably received within the cylinder, and is provided with flexible sealing discs 40, 42 on either surface thereof, supported by metal discs 44, 46 in a manner to prevent leakage of hydraulic fluid between the expansible chambers 48, 50, which are defined in the opposite ends of the control cylinder by the piston. The output shaft 10 passes through a bore 52 in the end wall of the control cylinder for driving a desired load, and the bores 34 and 52 are sealed by means of flexible sealing rings 54 and 56 set in the opposite ends of the cylinder.

To connect the expansible chambers 48 and 50 in a closed hydraulic system, the opposite ends of the cylinder are formed with ports 58 and 60, which are interconnected by means of a branched conduit 62 inserted therein. The conduit 62 has a series of parallel flow branches 62a, 62b, and 62c. The rate of motion of the output shaft 10 is controlled by the rate of flow of hydraulic fluid from one expansible chamber to the other through the branches of the conduit 62; motion may be stopped in any desired position by closing the branches of the conduit. For this purpose, a series of valves 64a, 64b, and 64c are interposed in the branches of the conduit, being operable by electrically-actuated solenoids 66a, 66b, and 66c, respectively. In the preferred embodiment, the orifice areas of the valves are not regulable, and do not affect the flow rates through each branch, but this function is performed instead by a series of fixed-area orifices 68a, 68b, and 68c in the various branches. According to a feature of the invention, the orifices are of varying cross-sectional areas bearing a specific series relationship to one another, such as 4:2:1, or any other desired relationship. By actuating selected ones or combinations of the valves 64a, 64b, and 64c, it will be apparent that seven different but precisely-regulated total orifice areas, and consequently seven rates of motion, may be established by parallel flow through the branches of the conduit 62. It will be understood that more or less branches than the three shown may be provided, to afford a greater or lesser number of choices of orifice area. This arrangement provides a wide selection of rates of motion with relatively few branches. It will also be apparent that valves whose orifice areas are regulable may alternatively be employed, in which case the fixed area orifices may be omitted. However, the difficulty of regulating the orifice area of a regulable valve with any great precision would limit the accuracy attainable with this type of system.

While the use of an hydraulic fluid system for controlling the motion of motive means provides comparatively accurate results, there is a tendency for such a device to slip, to a minor but nevertheless significant extent, particularly when the direction of movement is reversed. This slippage may be occasioned by the slight compressibility of the hydraulic fluid, by the inclusion of gas bubbles in the fluid, or by the compression and recompression of flexible seals used in the system, such as the seals 54, 56, 46, and 44 in the embodiment of FIG. 1. According to a further feature of the invention, such slippage is minimized to the point of negligibility by providing means for maintaining a continuous pressure in the closed hydraulic fluid system which is greater than the additional pressure in the hydraulic system caused by air acting on piston 14 in the motive means. By thus continuously pressurizing or "preloading" the hydraulic fluid, the fluid and any bubbles contained therein are maintained in a sufficiently compressed condition, as also are the flexible seals within the system, to avoid any substantial slippage arising from decompression and recompression as the piston 38 is reversed or arrested. In the embodiment shown, these pressurizing means comprise a differential piston 70, operably received in a mating cylinder 72. This cylinder has a chamber 74 of smaller cross-sectional area communicating in fluid-flow relation with the conduit 62 through a connecting tube 76, and a larger-area chamber 78 supplied with compressed fluid through a tube 80. The chamber 78 may, for example, communicate with the source of compressed air supplied by the tubes 20 and 22 to the pneumatic motor. It will be apparent that the differential in area of the active piston surfaces in the chambers 74 and 78 produces a multiplication of the supplied air pressure, so that the hydraulic fluid in the control system is maintained under a substantially greater pressure than the operating pressure of the motor. I provide an exhaust port 82 in the cylinder 72, intermediate the chambers 74 and 78, so that any air leakage past the piston will not contaminate the hydraulic fluid, but may escape to the atmosphere.

It should be understood that the improved motion control device is not limited to use with any particular form of motive means, such as the pneumatic motor which has been illustrated and described. Any desired means for pressurizing the hydraulic fluid system may be used in place of the differential piston device of the preferred embodiment. The conduit means connecting the expansible chambers formed by the piston in the control cylinder may assume a variety of forms. Further, other types of expansible chamber devices, in which flow from one expansible chamber to another is occasioned by the displacement of a movable element, may be substituted for the control cylinder and piston shown. The device is not limited to control of linear motion, but may be applied to angular motion by utilizing the angular displacement of a movable element to displace the fluid. Various additional changes and modifications will readily occur to those skilled in the art without departing from the true spirit and scope of the invention, which I therefore intend to define in the appended claims without limitation to details of the preferred embodiment which has been described and illustrated.

What I claim is:

1. A motion control device comprising, in combination: an expansible-chamber device including piston means, two expansible chambers, and conduit means connecting said expansible chambers for fluid transfer therebetween my movement of said piston means, motion-transmitting means drivingly connected with said piston means and adapted to be drivingly connected with motive means and with a device to be driven thereby, valve means interposed in said conduit means for regulating a flow of fluid between said expansible chambers to control motion of said motion-transmitting means, and means for establishing a pressure exceeding a predetermined value in hydraulic fluid within said expansible chambers comprising a differential piston having two active unequal areas, together with means for subjecting the larger of said areas to a pressure of said predetermined value, and the smaller of said areas to the hydraulic fluid pressure obtaining within said cylinder.

2. A motion control device comprising, in combination: an expansible-chamber device including piston means, two expansible chambers, and conduit means connecting said expansible chambers for fluid transfer therebetween by movement of said piston means and adapted to be drivingly connected with motive means and with a device to be driven thereby, valve means interposed in said conduit means for regulating a flow of fluid between said expansible chambers to control motion of said motion-transmitting means, and means for establishing a pressure exceeding a predetermined value in hydraulic fluid within said expansible chambers and said conduit means comprising a further expansible-chamber device having two active areas, together with independent means for subjecting one of said areas to an independent pressure of a predetermined value, and the other of said areas to the hydraulic fluid pressure obtaining within said cylinder and said conduit means.

3. A motion control device comprising, in combination: an expansible-chamber device including piston means, two expansible chambers, and branched conduit means connecting said expansible chambers for parallel-flow fluid transfer therebetween by movement of said piston means, each branch of said conduit means including a fixed-area orifice, motion, transmitting means drivingly connected with said piston means and adapted to be drivingly connected with motive means and with a device to be driven thereby, a plurality of selectively-actuable valve means one interposed in each branch of said conduit means for regulating a flow of fluid between said expansible chambers to control motion of said motion-transmitting means, and means for establishing a pressure exceeding a predetermined value in hydraulic fluid within said expansible chambers and said conduit means comprising a further expansible-chamber device having two active areas, together with independent means for subjecting one of said areas to an independent pressure of a predetermined value, and the other of said areas to the hydraulic fluid pressure obtaining within said cylinder and said conduit means.

4. A motion control device comprising, in combination: an expansible-chamber device including piston means, two expansible chambers, and branched conduit means directly connecting said expansible chambers for parallel-flow fluid transfer therebetween by movement of said piston means, each branch of said conduit means including a fixed-area orifice, said expansible chambers and said conduit means being completely filled by a continuous body of hydraulic fluid for transmission of fluid pressure throughout the system, motion-transmitting means drivingly connected with motive means and with a device to be driven thereby, a plurality of selectively-actuable valve means one interposed in each branch of said conduit means for regulating a flow of fluid between said expansible chambers to control motion of said motion-transmitting means, and independent means for establishing a pressure exceeding a predetermined value in hydraulic fluid within said expansible chambers and said conduit means.

5. A motion control device as recited in claim 1, said conduit means being branched for parallel-flow communication of said expansible chambers, each branch including a fixed-area orifice, and said valve means comprising a plurality of selectively-actuable valves each interposed in one of the branches.

References Cited by the Examiner

UNITED STATES PATENTS

| | | | |
|---|---|---|---|
| 217,275 | 7/79 | Gately | 121—118 |
| 725,456 | 4/03 | Lemp | 188—88 |
| 1,310,199 | 7/19 | Manton | 16—51 X |
| 2,624,318 | 1/53 | Walder | 121—45 |
| 2,807,336 | 9/57 | Sweeney | 188—97 |
| 2,857,789 | 10/58 | Robinson | 121—45 X |
| 2,999,482 | 9/61 | Bower | 121—38.3 |

FOREIGN PATENTS 694,872   8/40   Germany.

RICHARD B. WILKINSON, *Primary Examiner.*

FRED E. ENGELTHALER, KARL J. ALBRECHT, *Examiners.*